US008582762B2

(12) United States Patent
Holtmanns et al.

(10) Patent No.: US 8,582,762 B2
(45) Date of Patent: Nov. 12, 2013

(54) METHOD FOR PRODUCING KEY MATERIAL FOR USE IN COMMUNICATION WITH NETWORK

(75) Inventors: Silke Holtmanns, Vantaa (FI); Pekka Laitinen, Helsinki (FI); Philip Ginzboorg, Espoo (FI); Kari Miettinen, Klaukkala (FI); Jaakko Rajaniemi, Helsinki (FI)

(73) Assignee: Nokia Corporation, Espoo (FI)

( * ) Notice: Subject to any disclaimer, the term of this patent is extended or adjusted under 35 U.S.C. 154(b) by 1642 days.

(21) Appl. No.: 11/227,235

(22) Filed: Sep. 16, 2005

(65) Prior Publication Data

US 2006/0271785 A1  Nov. 30, 2006

(30) Foreign Application Priority Data

May 26, 2005  (FI) .................................... 20050562

(51) Int. Cl.
*H04L 9/32*  (2006.01)
*H04L 9/00*  (2006.01)

(52) U.S. Cl.
USPC ............................................. 380/44; 713/171

(58) Field of Classification Search
USPC ................. 713/150, 161, 168, 170–171, 178; 726/2–6, 26–30; 380/247, 255, 380/259–262, 270, 273, 36–37, 278, 279, 380/283, 44; 709/229, 249; 455/411, 426
See application file for complete search history.

(56) References Cited

U.S. PATENT DOCUMENTS

| 4,797,672 | A  | * | 1/1989 | Kousa ........................ 340/5.26 |
| 6,745,326 | B1 | * | 6/2004 | Wary ............................. 713/168 |
| 2003/0093680 | A1 | * | 5/2003 | Astley et al. .................. 713/183 |

FOREIGN PATENT DOCUMENTS

WO    WO 03088577 A1 * 10/2003

OTHER PUBLICATIONS

Draft Supplement to Standard for Telecommunications and Information Exchange Between Systems LAN/MAN Specific Requirements Part 11: Wireless Medium Access Control (MAC) and physical layer (PHY) specifications: Specification for Enhanced Security, Nov. 2002, IEEE, D3.0, pp. 1-16, 67-77, 117 and 186-187.*
3rd Generation Partnership Project; Technical Specification Group Services and System Aspects; 3G Security; Generic Authentication Architecture (GAA); System Description (Release 6), Sep. 2004, 3GPP, V6.0, pp. 1-14.*
Aboba et al., Extensible Authentication Protocol (EAP), Jun. 2004, The Internet Society, pp. 3, 8, and 55.*
Draft Supplement to Standard for Telecommunications and Information Exchange Between Systems LAN/MAN Specific Requirements Part 11: Wireless Medium Access Control (MAC) and physical layer (PHY) specifications: Specification for Enhanced Security, Nov. 2002, IEEE, D3.0, pp. 103-104.*
Falowo, O.E. et al., "*AAA and Mobility Management in UMTS-WLAN Interworking*", ICT2005, XP002412960, May 3-5, 2005, pp. 1-6.

(Continued)

*Primary Examiner* — Philip Chea
*Assistant Examiner* — Trong Nguyen
(74) *Attorney, Agent, or Firm* — Harrington & Smith

(57) ABSTRACT

This invention relates to security procedures in a communication system, specifically to production of key material. The invention provides a method for producing key material in a highly secure way for use in communication with a local network of a company. The method uses authentication information obtained from the communication system and information exchanged locally between a mobile station and the authentication systems of the company to produce a communication key for use in authentication procedures or e.g. for signing and/or encrypting data.

35 Claims, 2 Drawing Sheets

(56) References Cited

OTHER PUBLICATIONS

Ray-Guang, Cheng et al., "*3-G Based Access Control for 3GPP-WLAN Interworking*", IEEE, XP-010766794, May 17-19, 2004, pp. 2967-2971.

Menezes, P. van Oorschot et al., "*Handbook of Applied Cryptography*", XP-002412959, 1997, pp. 497-499, pp. 546-548 and pp. 570.

International Search Report for international application PCT/IB2006/001374 filed May 18, 2006.

N. Asokan, et al.; "Man-in-the-Middle in Tunnelled Authentication Protocols"; Nov. 11, 2002; pp. 1-14.

Certified Wireless Network Professional, "802.11i Authentication and Key Management (AKM)", White Paper, May 2005, Planet3 Wireless, Inc., Devin Akin, CTO.

3GPP TS 33.220, "3$^{rd}$ Generation Partnership Project; Technical Specificaton Group Services and System Aspects; Generic Authentication Architecture (GAA); Generic Bootstrapping architecture," (Release 6) , V6.2.0 (Sep. 2004).

* cited by examiner

METHOD FOR PRODUCING KEY MATERIAL FOR USE IN COMMUNICATION WITH NETWORK

FIELD OF INVENTION

This invention relates to security procedures in a communication system, specifically to production of key material.

List of Acronyms:
AK Anonymity Key
AKA Authentication and Key Agreement
BSF Bootstrapping Server Function
B-TID Bootstrapping Transaction Identifier
CA Certificate Authority
GAA Generic Authentication Architecture
GBA Generic Bootstrapping Architecture
GBA_ME ME-based GBA
GBA_U GBA with UICC-based enhancements
GPS Global Positioning System
GUSS GBA User Security Settings
HSS Home Subscriber System
HTML Hypertext Markup Language
IK Integrity Key
IKE Internet Key Exchange
KDF Key Derivation Function
Ks_ext_NAF Derived key in GBA_U
Ks_int_NAF Derived key that remains on UICC in GBA_U
MNO Mobile Network Operator
NAF Network Application Function
PIN Personal Identification Number
PKI Public Key Infrastructure
UICC UMTS IC Card
UMTS Universal Mobile Telecommunications System
USS User Security Setting
VPN Virtual Private Network

TECHNOLOGICAL BACKGROUND

A communication system is a facility that enables communication between two or more entities such as user terminal equipment and/or network entities and other nodes associated with a communication system. The communication may comprise, for example, communication of voice, electronic mail (email), text messages, data, multimedia and so on.

The communication may be provided by fixed line and/or wireless communication interfaces. A feature of wireless communication systems is that they provide mobility for the users thereof. An example of a communication system providing wireless communication is a public land mobile network (PLMN). An example of the fixed line system is a public switched telephone network (PSTN).

A cellular telecommunication system is a communications system that is based on the use of radio access entities and/or wireless service areas. The access entities are typically referred to as cells. Examples of cellular telecommunication standards include standards such as GSM (Global System for Mobile communications), GPRS (General Packet Radio Servers), AMPS (American Mobile Phone System), DAMPS (Digital AMPS), WCDMA (Wideband Code Division Multiple Access), UMTS (Universal Mobile Telecommunication System) and CDMA 2000 (Code Division Multiple Access 2000).

A communication system typically operates in accordance with a given standard or specification which sets out what the various elements of a system are permitted to do and how that should be achieved. For example, the standard of specification may define if the user, or more precisely user equipment is provided with a circuit switched service of a packet switched service or both. Communication protocols and/or parameters which should be used for the connection are also typically defined. For example, the manner in which communication shall be implemented between the user equipment and the elements of the communication network is typically based in a predefined communication protocol. In other words, a specific set of "rules" on which the communication can be based needs to be defined to enable the user equipment to communicate via the communication system. Typically, given standards will also define how authentication and authorisation mechanisms as well as how accounting systems should work.

Certain authentication methods are known for allowing the user of a mobile station to authenticate himself to a service provider, or for example for remotely accessing corporate information systems. One way to authenticate corporate user is to authenticate him based on the same password that he is using for logging into the corporate network within the corporate premises. For example, a VPN connection is typically established using the IKE protocol, and Internet based authentication schemes such as HTML Forms and HTTP Digest can be used to obtain corporate network login and password from the user. These methods require that the user knows the password. However, these methods have the problem that the username and password of the user may have been illegitimately obtained by observing the user while the user is logging in, or via other routes.

A stronger security model requires the use of an item the user has in addition to something the user knows. For example, the item can be a physical key, a smart card, or a device. One such device is the SecurID device manufactured by the RSA Security Corporation. A SecurID device has an accurate internal clock, and displays access codes. These access codes are dependent on time and initialization information within the SecurID device.

However, even that solution has certain drawbacks. It is inconvenient for the user to take care that the device is with him when it is needed. The user may need to remember another PIN (personal identification number), in case the device requires input of a PIN. The access code provided by the device is valid for only a rather short time, which is too inflexible for certain use cases. For example, a travelling user may have no good network connection and the network delays may cause authentication failures due to time-out of the access code. Also, purchasing these devices for each user may be expensive for an organization.

Another solution which would provide a second authentication factor in addition to knowing a password would be installing a secret in a station, such as a mobile station, of the user and using that secret as a factor in the authentication. Modern mobile stations have a smart card such as an UICC (UMTS IC Card) for storing subscription information. Thus, the secret could be stored in the UICC.

However, this solution also has certain drawbacks. This solution would require purchasing special UICC:s from the mobile network operator, and obtaining such UICC:s for the whole organization may cost a substantial sum of money. Moreover, an employee might be required to use a new telephone number if he changes his UICC.

SUMMARY OF THE INVENTION

Embodiments of the present invention aim to overcome one or several of the above problems.

According to one aspect of the invention, a method for producing key material in a station of a communication system is provided. The method comprises the steps of producing authentication information by performing an authentication procedure with the communication system, exchanging key generation information with a second system external to the communication system, and generating a communication key for communication with the second system at least in part on the basis of the authentication information and the key generation information.

The method can further comprise the steps of encrypting an identification code, a password, or shared secret with the generated communication key, and transmitting the encrypted identification code, password, or shared secret.

The communication key can be generated at least in part on the basis of time information.

The key generation information can comprise seed information for a sequence, the step of generating a communication key can comprise the step of generating a next item in the sequence, and the communication key can be generated at least in part on the basis of the generated item.

The key generation information can also comprise a time value.

The authentication procedure can be a GAA authentication procedure.

The authentication information can be produced at least in part on the basis of a salt value.

According to a second aspect of the invention, a method for producing key material in a node of an authentication system is provided. The method comprises the steps of requesting authentication information related to a station from an authentication node of a communication system, exchanging key generation information with the station externally to the communication system, and generating a communication key at least in part on the basis of the authentication information and the key generation information.

The method can further comprise the steps of decrypting an identification code, a password, or a shared secret with the generated communication key, and verifying the correctness of the decrypted identification code, password, or shared secret.

The communication key can be generated at least in part on the basis of time information.

The key generation information can comprise seed information for a sequence, the step of generating a communication key can comprise the step of generating a next item in the sequence, and the communication key can be generated at least in part on the basis of the generated item.

According to a third aspect of the invention, a station for a communication system is provided. The station comprises means for producing authentication information by performing an authentication procedure with the communication system, means for exchanging key generation information with a second system external to the communication system, and means for generating a communication key for communication with the second system at least in part on the basis of the authentication information and the key generation information.

The station can further comprise means for encrypting an identification code, password, or shared secret with a generated communication key, and a transmitter for transmitting an encrypted identification code, password, or shared secret.

The means for generating a communication key can be adapted to generate the communication key at least in part on the basis of time information.

The station can further comprise means for generating a sequence on the basis of seed information in key generation information, and the means for generating the communication key can be adapted to generate a communication key at least in part on the basis of an item generated by the means for generating a sequence.

The station can be a mobile station for a wireless communication system.

According to a fourth aspect of the invention, a node for an authentication system is provided. The node comprises means for requesting authentication information related to a station of a wireless communication system from an authentication node of the wireless communication system, means for exchanging key generation information with a station of a wireless communication system externally to the wireless communication system, and means for generating a communication key at least in part on the basis of authentication information and key generation information.

The node can further comprise means for decrypting an identification code, password, or a shared secret with the generated communication key, and means for verifying the correctness of a decrypted identification code, password or shared secret.

The node can further comprise means for generating a sequence on the basis of seed information in key generation information, and the means for generating the communication key can be adapted to generate a communication key at least in part on the basis of an item generated by the means for generating a sequence.

The node can be a network application function node for a wireless communication system.

According to a fifth aspect of the invention, a system for producing key material is provided. The system comprises a first authentication node, a second authentication node, means in the second authentication node for requesting authentication information related to a station from the first authentication node, means in the second authentication node for exchanging key generation information with a station externally to the communication system, and means in the second authentication node for generating a communication key at least in part on the basis of authentication information and key generation information.

The first authentication node can be an authentication node of a wireless communication network. The second authentication node can be an authentication node of a local area network.

The system may further comprise a mobile station, means in the mobile station for producing authentication information by performing an authentication procedure with the first authentication node, means in the mobile station for exchanging key generation information with the second authentication node, and means in the mobile station for generating a communication key at least in part on the basis of the authentication information and the key generation information.

According to a further aspect of the invention, a station for a communication system is provided. The station comprises a controller for producing authentication information by performing an authentication procedure with the communication system, a controller for exchanging key generation information with a second system external to the communication system, and a key generator for generating a communication key for communication with the second system at least in part on the basis of the authentication information and the key generation information The station can further comprise an encryptor for encrypting an identification code with the generated communication key, and a transmitter for transmitting the encrypted identification code.

The station can further comprise a sequence generator for generating a sequence on the basis of seed information in the key generation information. The key generator can be configured to generate the communication key at least in part on the basis of an item generated by the means for generating a sequence.

According to a further aspect of the invention, a node for an authentication system is provided. The node comprises a requester for requesting authentication information related to a station of a wireless communication system from an authentication node of the wireless communication system, a controller for exchanging key generation information with a station of a wireless communication system externally to the wireless communication system, and a key generator for generating a communication key at least in part on the basis of authentication information and key generation information.

The node can further comprise a decryptor for decrypting an identification code with a generated communication key, and a controller for verifying the correctness of a decrypted identification code.

The key generator can be configured to generate a communication key at least in part on the basis of time information.

The node can further comprise a sequence generator for generating a sequence on the basis of seed information in key generation information. The key generator can be configured to generate a communication key at least in part on the basis of an item generated by the means for generating a sequence.

According to a further aspect of the invention a system for producing key material is provided. The system comprises a first authentication node, a second authentication node, a requester in the second authentication node for requesting authentication information related to a station from the first authentication node, a controller in the second authentication node for exchanging key generation information with a station externally to the communication system, and a key generator in the second authentication node for generating a communication key at least in part on the basis of authentication information and key generation information.

The system may further comprise a mobile station, a controller in the mobile station for producing authentication information by performing an authentication procedure with the first authentication node, a controller in the mobile station for exchanging key generation information with the second authentication node, and a key generator in the mobile station for generating a communication key at least in part on the basis of the authentication information and the key generation information.

BRIEF DESCRIPTION OF THE DRAWINGS

Embodiments of the present invention will now be described by way of example with reference to the accompanying drawings, in which.

DETAILED DESCRIPTION OF EMBODIMENTS

Figure 1:
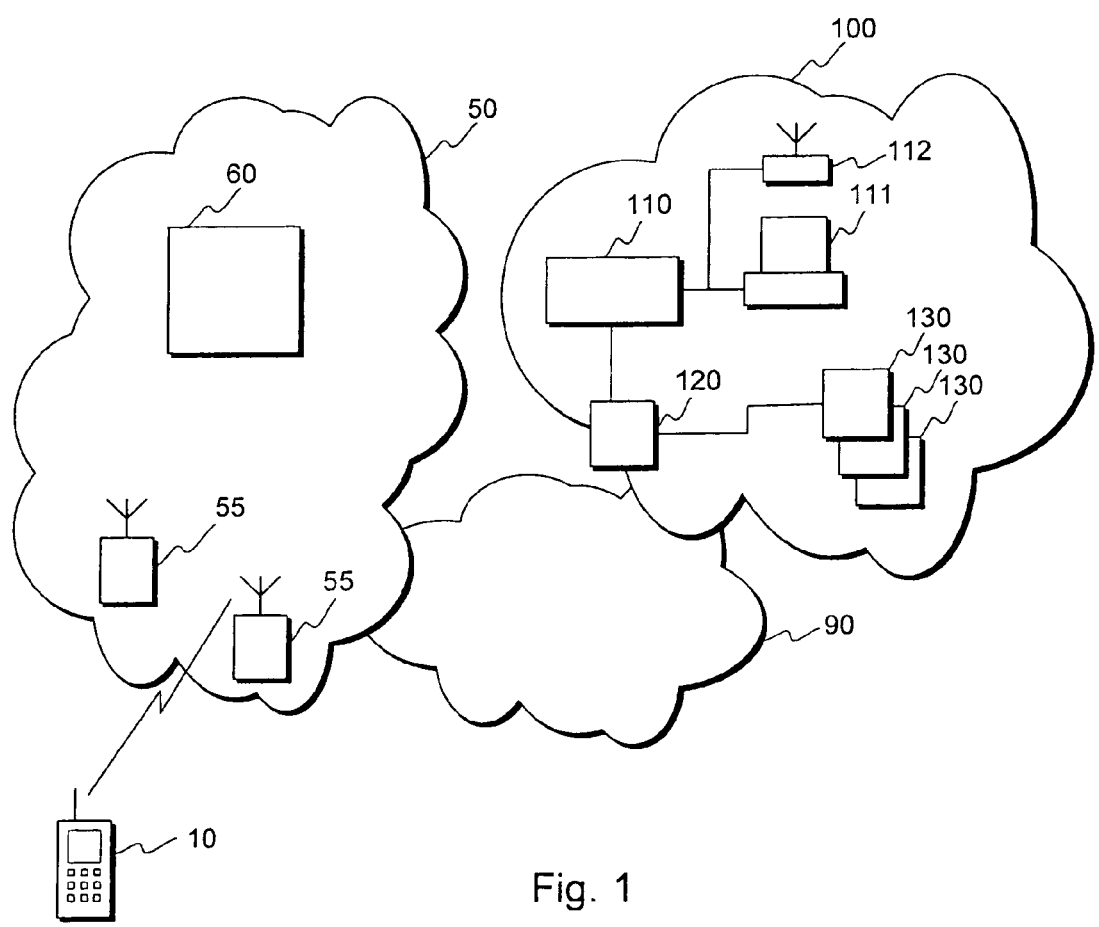
FIG. 1 illustrates a communication system, a local area network and a mobile station according to an embodiment of the invention.

FIG. 1 illustrates a system according to an embodiment of the invention. FIG. 1 shows a communication system 50, a local area network (LAN) 100, and a mobile station 10. The communication system can be for example a wireless communication system such as a CDMA or a 3GPP network or part of such a network. The local area network 100 can be for example the internal network of a company or some other organization. FIG. 1 illustrates a firewall node 120 of the local area network, an authentication node 110, and a number of server nodes 130 of the local area network. The local area network also comprises a terminal 111 and a wireless link 112 such as a WLAN access point, a Bluetooth transceiver or an infrared transceiver, which are functionally connected to the authentication node 110. This example assumes that whenever a new connection attempt is made to the LAN 100 from outside the LAN, the firewall node 120 may reject the attempt if the attempt matches a rejection policy, or may forward the attempt to the authentication node 110, or for example may allow the connection attempt to proceed to a server 130 if the attempt matches a certain rule. Exactly how a firewall node handles incoming connections is an implementation specific detail, and will not be detailed further here for clarity.

FIG. 1 illustrates an authentication node 60 of the communication system 50. The authentication node performs authentication procedures with mobile stations attempting to contact the communication system 50. In certain cellular communication networks, the authentication node can be a BSF (bootstrapping server function) node.

The communication system 50 also comprises a number of base stations 55 for communicating with mobile stations. A communication system typically comprises a large number of other nodes as well, but they are not illustrated in FIG. 1 for reasons of clarity.

The communication system 50 and the LAN 100 can be connected to each other for example via the internet 90 or some other network 90.

The invention provides a method for generating key material for communication with the LAN 100 with a high level of security.

According to an advantageous embodiment of the invention, a hardware based authentication factor is provided by relying on authentication mechanisms of a communication system to provide authentication information such as a shared secret known to a station 10 and the communication system 50, having the corporate authentication node 110 where the authentication is desired obtain the authentication information from the communication system 50, arranging a second shared secret (or in other words, key generation information) to both the station 10 and the corporate authentication node 110 via a route external to the communication system 50, and generating a communication key at least in part on the basis of the authentication information and the key generation information.

Figure 2:
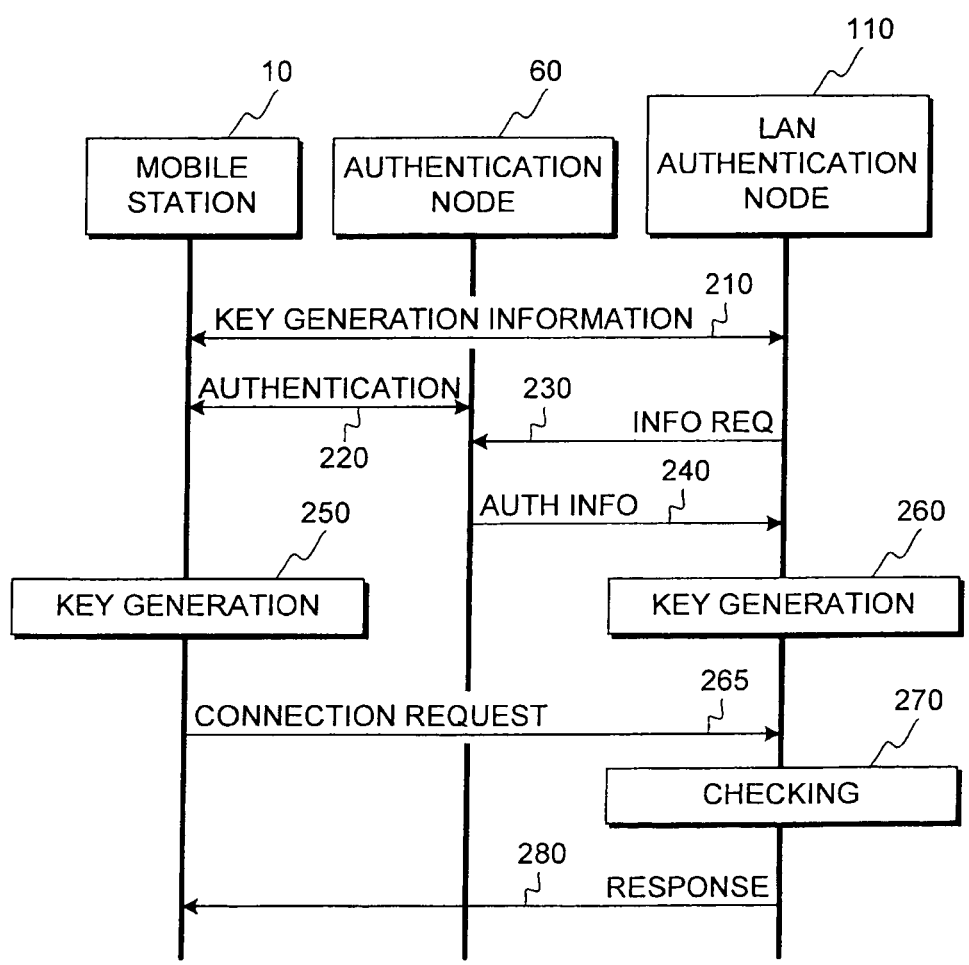
FIG. 2 illustrates signalling between a mobile station, an authentication node of a communication system and an authentication node of a local area network.

FIG. 2 illustrates a method according to an embodiment of the invention. FIG. 2 illustrates signalling between a mobile station 10, an authentication node 60 of a communication system, and an authentication node 110 of a LAN. In step 210, the mobile station and the authentication node 100 of the LAN exchange key generation information. In step 220, the mobile station performs an authentication procedure with the authentication node 60 of the communication system. In step 230, the authentication node of the LAN requests authentication information from the authentication node 60 of the communication system. In step 240, the authentication node 60 of the communication system sends authentication information to the authentication node 110 of the LAN.

In step 250, the mobile station generates a communication key for use in communication with the LAN. In step 260, the LAN authentication node 110 generates a communication key for use in communicating with the mobile station.

Later, in step 265, the mobile station initiates a connection with the LAN by transmitting a connection request message to the LAN. The authentication node 110 receives the request, and checks in step 270 that the request is valid using the communication key generated in step 260. For example, the authentication node can check a signature. In step 280, the LAN authentication node 110 transmits a response to the mobile station.

FIG. 2 is only an example. The procedure used by the mobile station to establish a connection to the LAN via the communication system 50 can be different in many ways from that shown in FIG. 2, depending on the particular implementation details of protocols employed in communication system 50 and the LAN 100.

The ordering of the steps can also be different in different embodiments of the invention. For example, the steps 230, 240, and 260 can in an embodiment of the invention occur after receiving a connection request from the mobile station. In such an embodiment, the LAN authentication node 110 requests the authentication information from the communication system and generates the communication key as a response to receiving a connection request from the mobile station.

The corporate authentication system may have access to the communication system in order to facilitate the obtaining of the shared secret known both to the station and the communication system. For example, the corporate authentication system may comprise a NAF (network application function) of a 3G cellular communication system, whereby the NAF may obtain the shared secret resulting from an GAA (generic authentication architecture) authentication procedure between a mobile station and the cellular communication system using methods specified in the 3GPP standards. A detailed description of a NAF can be found for example from 3GPP TS 33.220.

The authentication mechanism of the communication system can be for example the GAA of a 3G cellular communication system. In such an embodiment, a mobile station and a BSF (bootstrapping server function) perform an authentication procedure, which results in a shared secret known by the mobile station and the BSF node. According to 3GPP standards, a NAF node may request the shared secret associated with a mobile station from a BSF node.

The second shared secret can be a PIN or for example a password. The second shared secret can also comprise a random seed value for a sequence, whereby a different value from the sequence can be used in generation of the communication key. The sequence can for example be a predefined pseudorandom sequence, or any other predefined sequence such as a sequence of hash values.

The second shared secret can be exchanged in a variety of ways between the station and the corporate authentication system. The second shared secret can be transmitted from the station to the system, from the system to the station, or for example in both directions. In the case that the second shared secret is input by the user of the station or generated by the station, the second shared secret can be transmitted from the station to the system. In the case that the second shared secret is generated by the system or input to the system by the maintainers of the system, the second shared secret can be transmitted from the system to the station. The second shared secret can comprise parts originating both from the station and from the system, in which case these parts can be exchanged in both directions.

This exchanging of the second shared secret can be done in a variety of ways. In order to ensure that the communication system such as a cellular network or its operators cannot know the second shared secret, the second shared secret is preferably exchanged via a route external to the communication system. The exchange can proceed via short-range wireless methods such as via an infrared connection or a Bluetooth connection. The exchange can also be implemented by having the user of a mobile station input the second shared secret via the keypad of the mobile station.

In embodiments in which time dependence of the communication key is desired, the generation of a communication key can include time information. This time information can be obtained for example from the Global Positioning System (GPS), in case the mobile station comprises GPS receiver functionality. In other embodiments other sources of time information can be used. For example, an internal clock of the mobile station can be used as well.

The communication key can be used in various ways. For example, the communication key can be used as a password as such. The communication key can also be used to encrypt a PIN or a password input by the user of the station.

In a further embodiment where the invention is implemented within a 3G cellular network, the set up of the authentication information can proceed as follows.

In this example, it is assumed that the company authentication system knows the identity ID1 (e.g. his phone number) of the user in the communication system, and the identity ID2 of the user within the company authentication system (e.g. the user's identifier in the network of the company), and that they are associated with the same user. This binding of ID1 and ID2 can be done for example by the administrator of the authentication system of the company.

This example also assumes that the mobile station and the company authentication system share a secret P that is unknown to the communication system. For instance, that secret could be the user's company password, or something derived from the password using a suitable predetermined key derivation function (KDF). As another example, the secret could be agreed on in a secure way, e.g. inputting the secret into the mobile inside the company premises or through a secure connection the company's server.

The GAA of the communication system (the cellular network) provides a shared secret Ks_NAF and an identity ID1 of the user in the communication system to the company authentication system, which acts as a NAF. The mobile station has derived the same shared secret Ks_NAF during the GAA authentication procedures, for example as defined in TS 33.220.

First, the mobile station and the company authentication system exchange random seeds. The mobile station sends a random seed R1 to the company authentication system, and the company authentication system sends back another random seed R2 to the mobile station. This exchange of random seeds can be done for example using local connections, e.g. using a short range radio link such as a Bluetooth link, or for example using an infrared connections. The exchange of random seeds can also be performed manually using a keyboard and a display of the mobile station to input and output the random seed values, and a terminal device connected to the company authentication system. Use of such local connections provides a higher level of security than using a communication channel via communication system.

The mobile station then derives a new communication key Ks_co from both random seeds, the secret P it shares with the company, the Ks_NAF. For instance, Ks_co could be the result of computing KDF(R1,R2,P, Ks_NAF). For each communication session, a new Ks_NAF key can be obtained by initiating a new authentication procedure between the mobile station and the mobile system. This Ks_co is not known by the mobile network operator, as it uses shared secret information which has not passed via the systems of the mobile network operator. The authentication system of the company can also produce the same Ks_co, which allows the authentication system to authenticate the user.

In a further embodiment, at least one of the identifiers ID1 and ID2 is used in derivation of Ks_co as well.

In a further embodiment, only one random seed is exchanged between the mobile station and the company authentication system and used in derivation of Ks_co. The invention is not limited to any particular direction in which the one random seed is exchanged, as the random seed can be generated by the mobile station as well as the authentication system.

The calculated communication key Ks_co can then be used to securely communicate with the company. For example, it could be used to send an encrypted PIN or password to the company. The encrypted result can be transmitted for example via a text message from the mobile station, or can be input by the user of the mobile station at the company web access site. The Ks_co usage can also be protected with a PIN, for example by arranging the mobile station to require the input of a correct PIN before allowing a procedure requiring the use of the Ks_co key to start.

If the mobile station and the company authentication system both have access to an accurate time source, time can also be used as a parameter in derivation of the communication key Ks_co. Such a time source can be for example the GPS system. In this embodiment, the mobile station transmits the current time T1 at the time of the transmission to the company authentication system. The company authentication system checks that the time difference between T1 and the time T2 of reception of the time message by the company authentication system is less than a predetermined threshold value. If the time difference is larger than the threshold value, the company authentication system can send an error message, and/or abort the operation. If the time difference is smaller than the threshold value, the operation for derivation of the communication key can continue. In this embodiment, the time value T1 is used in calculation of the Ks_co key as one of the inputs into the predetermined key derivation function.

The threshold value can advantageously be determined large enough so as to allow reasonable network delays to occur, but still small enough to avoid replay attacks.

The dependence of Ks_co on time makes the system more secure. For example, after the first key derivation Ks_co could be periodically and independently rederived by both parties and thus hinder replay attacks. For example, every d seconds each party could update the value of T1: T1=T1+d and recompute Ks_co as described above.

The invention does not limit the ways in which the communication key referred to as Ks_co is used. The communication key can be used for example to authenticate a connection, to encrypt a connection, and/or to provide integrity using message signatures. The communication key can also be used as a basis for creating further keys for specific tasks.

In the current 3GPP GAA specifications, the bootstrapping procedure may happen without any user interaction, i.e., the GAA security credentials can be established without requiring the user to do anything. This enables the possibility that when the mobile station has been stolen the thief can continue to use the services secured by 3GPP GAA until the subscriber has informed the operator that the mobile station has been stolen and the operator has revoked subscriber's subscription, after which the bootstrapping procedure does not succeed any more.

In a further embodiment of the invention, a salt is used also in the bootstrapping procedure between a mobile station and the communications network, i.e. in the authentication negotiation that results in a shared secret known by both the mobile station and the communications network. In 3GPP standards, this authentication procedure is referred to as the bootstrapping procedure between the mobile station and the BSF node. The salt may comprise a PIN, a password or a passphrase. The salt may also comprise some biometrical data such as data resulting from a fingerprint scan or a retinal scan, or something else that is either known by the subscriber or possessed by the subscriber. Adding salt to the bootstrapping provides higher level of security, as the bootstrapping procedure will fail if the salt is not entered, or the salt is wrong.

There are several ways how the bootstrapping procedure can incorporate the salt value. In the following, we give some examples about how to incorporate the salt value in systems following the 3GPP standards.

For example, the salt value can be used in authentication vector AV generation: a PIN can be used to generate a special AV in HSS, and in the mobile station the subscriber is required to use the salt when AV vector is validated in the USIM (or ISIM).

For example, the salt can be used in HTTP Digest AKA. For example, the salt may be appended to the RES value and used as the HTTP Digest password, in which case the password would be RES ∥ SALT instead of RES in the prior art HTTP Digest AKA.

The BSF can indicate to the mobile station that a salt value is required in various ways. For example, the required salt value type can be indicated in the HTTP Digest parameters. The salt type can also be indicated in a separate HTTP Header, for example "X-3GPP-Salt-Required: PIN". The mobile station may also implicitly know that a certain type of salt is required by the BSF in which case no indication is required.

In order to distinguish between two authentication failures in the BSF, namely wrong SALT entry, and USIM authentication failure, prior art HTTP Digest AKA procedure can be altered to contain bootstrapping authentication with and without salt. This enables the BSF to discover the reason for the authentication failure. Thus, two responses can be delivered to the BSF: normal response, which has been calculated using RES as the password (normal HTTP Digest AKA), and an additional response, which has been calculated using RES and the salt value as the password. These responses can be transmitted to the BSF using HTTP Digest in various ways. For example, the two responses can be concatenated to the "response" value of HTTP Digest AKA. For example, the "response" value can be used to transfer the normal response to the BSF, and a new HTTP Digest attribute can be used for the response calculated using RES and SALT as password.

It is noted that while the preceding description illustrates various embodiments of the invention within a 3G cellular telecommunications system, the invention is not limited to a so called 3G cellular system, but can be implemented in different types of cellular telecommunication systems as well. The invention can be implemented for example also in other wireless or wired communication systems.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
producing, by a mobile station, authentication information by performing an authentication procedure with a communication system, the authentication procedure performed through a path external to a second system;
exchanging, by the mobile station and through a route external to the communication system, key generation information comprising a shared secret with the second system and wherein the shared secret is not known to the communication system, said exchanging the key generation information comprises providing a time value of a transmission initiated by the mobile station for performing at least one of: issuing an error message and interrupting said exchanging by the second system, if a delay of said transmission received by the second system exceeds a threshold value; and
generating, by the mobile station, a communication key to communicate with the second system using at least in part the authentication information and the key generation information to establish a communication of the mobile station with the second system using said communication key generated by the mobile station and a second communication key generated by the second system using at least in part the key generation information and said authentication information requested and received by said second system from the communication system,
wherein the communication system comprises at least one base station and the second system comprises at least one server node.

2. The method of claim 1, further comprising:
encrypting an identification code with the communication key generated by the mobile station; and
transmitting the encrypted identification code.

3. The method of claim 1, further comprising:
encrypting a password with the communication key generated by the mobile station; and
transmitting the encrypted password.

4. The method of claim 1, wherein:
the communication key is generated based at least in part on time information.

5. The method of claim 1, wherein:
the key generation information comprises a password.

6. The method of claim 1, wherein:
the key generation information comprises seed information for a sequence;
the generating a communication key comprises generating a next item in the sequence; and
the communication key is generated based at least in part on the generated next item.

7. The method of claim 1, wherein:
the authentication procedure performed in the producing the authentication information is a generic authentication architecture authentication procedure.

8. The method of claim 1, wherein:
the authentication information is produced based at least in part on a salt value.

9. The method of claim 1, wherein the shared secret comprises at least one of: a personal identification number, a password, or a random seed value for a sequence.

10. A method, comprising:
requesting and receiving, by a second system, authentication information related to a mobile station from an authentication node of a communication system;
exchanging by the second system, through a route external to the communication system, key generation information comprising a shared secret with the mobile station, wherein the shared secret is not known to the communication system and comprises at least one of: a personal identification number, a password, or a random seed value for a sequence, said exchanging the key generation information comprises providing a time value of a transmission initiated by the mobile station for performing at least one of: issuing an error message and interrupting said exchanging by the second system, if a delay of said transmission received by the second system exceeds a threshold value; and
generating a communication key by the second system to communicate with the mobile station using at least in part the authentication information and the key generation information, wherein the communication system comprises at least one base station and-the second system comprises at least one server node.

11. The method of claim 10, comprising:
decrypting an identification code with the generated communication key; and
verifying correctness of the decrypted identification code.

12. The method of claim 10, comprising:
decrypting a password with the generated communication key; and
verifying correctness of the decrypted password.

13. The method of claim 10, wherein:
the communication key is generated based at least in part on time information.

14. The method of claim 10, wherein the exchanging the key generation information comprises exchanging a password.

15. The method of claim 10, wherein:
the key generation information comprises seed information for a sequence;
the generating a communication key comprises generating a next item in the sequence; and
the communication key is generated based at least in part on the generated next item.

16. The method of claim 10, wherein exchanging, through a route external to the communication system, key generation information comprising a shared secret further comprises exchanging by the mobile station at least the shared secret using one of an infrared connection or a Bluetooth connection to the second system via a network and wherein the mobile station is configured to communicate directly with the communication system.

17. The method of claim 10, wherein exchanging, through a route external to the communication system, key generation information comprising a shared secret with the mobile station further comprises having a user input the shared secret via a keypad of the mobile station.

18. A non-transitory computer-readable storage medium encoded with instructions configured to control a processor to perform a process, the process comprising:
producing authentication information by performing an authentication procedure between a mobile station and a communication system, the authentication procedure performed through a path external to a second system;
exchanging between the mobile station and the second system, through a route external to the communication system, key generation information comprising a shared secret with the second system, wherein the shared secret is not known to the communication system, said exchanging the key generation information comprises providing a time value of a transmission initiated by the mobile station for performing at least one of: issuing an error message and interrupting said exchanging by the second system, if a delay of said transmission received by the second system exceeds a threshold value; and
generating a communication key by the mobile station to communicate with the second system based at least in part on the authentication information and the key generation information to establish a communication of the mobile station with the second system using said communication key generated by the mobile station and a second communication key generated by the second system using at least in part the key generation information and said authentication information requested and received by said second system from the communication system, wherein the communication system comprises at least one base station and the second system comprises at least one server node.

19. A non-transitory computer-readable storage medium encoded with instructions configured to control a processor to perform a process, the process comprising:
requesting and receiving by a second system, authentication information related to a mobile station from an authentication node of a communication system;
exchanging between the mobile station and the second system, through a route external to the communication system, key generation information comprising a shared secret with the mobile station, wherein the shared secret is not known to the communication system and comprises a personal identification number, a password, or a random seed value for a sequence, said exchanging the key generation information comprises providing a time value of a transmission initiated by the mobile station for performing at least one of: issuing an error message and interrupting said exchanging by the second system, if a delay of said transmission received by the second system exceeds a threshold value; and
generating a communication key for communication of the second system with the mobile station using at least in part the authentication information and the key generation information, wherein the communication system comprises at least one base station and the second system comprises at least one server node.

20. A mobile station, comprising:
a processor; and
a memory including computer program code,
the memory and the computer program code configured to, with the processor, cause the mobile station at least to
produce authentication information by performing an authentication procedure with a communication system, the authentication procedure performed through a path external to a second system,
perform exchanging, through a route external to the communication system, key generation information comprising a shared secret with the second system, wherein the shared secret is not known to the communication system, said exchanging the key generation information comprises providing a time value of a transmission initiated by the mobile station for performing at least one of: issuing an error message and interrupting said exchanging by the second system, if a delay of said transmission received by the second system exceeds a threshold value, and
generate a communication key to communicate with the second system based at least in part on the authentication information and the key generation information to establish a communication of the mobile station with the second system using said communication key generated by the mobile station and a second communication key generated by the second system using at least in part the key generation information and said authentication information requested and received by said second system from the communication system, wherein the communication system comprises at least one base station and the second system comprises at least one server node.

21. The mobile station of claim 20, wherein the memory and the computer program code are further configured to, with the processor, cause the mobile station at least to:
encrypt an identification code with the communication key generated by the mobile station; and
transmit the encrypted identification code.

22. The mobile station of claim 20, wherein the memory and the computer program code are further configured to, with the processor, cause the mobile station at least to:
generate the communication key based at least in part on time information.

23. The mobile station of claim 20, wherein the memory and the computer program code are further configured to, with the processor, cause the mobile station at least to:
generate a sequence based on seed information in the key generation information; and
generate the communication key based at least in part on an item generated by the sequence generator.

24. The mobile station of claim 20, wherein the mobile station is part of a wireless communication system.

25. An apparatus, comprising:
a processor; and
a memory including computer program code,
the memory and the computer program code configured to, with the processor, cause the apparatus at least to
request authentication information related to a mobile station, the authentication information being received from an authentication node of a wireless communication system,
perform exchanging between the mobile station and a second system comprising said apparatus, through a route external to the wireless communication system, key generation information comprising a shared secret with the mobile station, wherein the shared secret is not known to the wireless communication system and comprises at least one of: a personal identification number, a password, or a random seed value for a sequence, said exchanging the key generation information comprises providing a time value of a transmission initiated by the mobile station for performing at least one of: issuing an error message and interrupting said exchanging by the second system, if a delay of said transmission received by the second system exceeds a threshold value; and
generate a communication key for communication of the second system with the mobile station based at least in part on the authentication information and the key generation information, wherein the wireless communication system comprises at least one base station and the second system comprises at least one server node.

26. The apparatus of claim 25, wherein the memory and the computer program code are further configured to, with the processor, cause the apparatus at least to:
decrypt an identification code with a generated communication key; and
verify correctness of a decrypted identification code.

27. The apparatus of claim 25, wherein the memory and the computer program code are further configured to, with the processor, cause the apparatus at least to:
generate a communication key based at least in part on time information.

28. The apparatus of claim 25, wherein the memory and the computer program code are further configured to, with the processor, cause the apparatus at least to:
generate a sequence based on seed information in the key generation information; and
generate a communication key based at least in part on an item generated by the apparatus.

29. The apparatus of claim 25, wherein the apparatus comprises a functionality of a network application function node for a wireless communication system.

30. The apparatus of claim 25, wherein exchanging, through a route external to the wireless communication system, key generation information comprising a shared secret further comprises exchanging by the mobile station at least the shared secret using one of an infrared connection or a Bluetooth connection to the second system via a network and wherein the mobile station is configured to communicate directly with the communication system.

31. The apparatus of claim 25, wherein exchanging, through a route external to the wireless communication system, key generation information comprising a shared secret with the mobile station further comprises having a user input the shared secret via a keypad of the mobile station.

32. A system, comprising:
a mobile station;
a controller in the mobile station configured to produce authentication information by performing an authentication procedure with a first authentication node associated with a first communication system through a path external to a second communication system;
a controller in the mobile station configured to perform exchanging key generation information with a controller in a second authentication node associated with the second communication system through a route external to the first communication system, said exchanging the key generation information comprises providing a time value of a transmission initiated by the mobile station for performing at least one of: issuing an error message and interrupting said exchanging by the second communication system, if a delay of said transmission received by the second communication system exceeds a threshold value;
a requester in the second authentication node configured to request authentication information related to the mobile station from the first authentication node;
wherein the key generation information comprises a shared secret with the mobile station, wherein the shared secret is not known by the first communication system and comprises at least one of:
a personal identification number, a password, or a random seed value for a sequence; and
a key generator in the second authentication node configured to generate a communication key based at least in part on the authentication information and the key generation information to establish a communication of the second communication system with the mobile station using said communication key generated in the second authentication node and a communication key generated by the mobile station using at least in part the key generation information and said authentication information, wherein the first communication system comprises at least one base station and the second communication system comprises at least one server node.

33. The system of claim 32, wherein:
the first communication system is a wireless communication network.

34. The system of claim 32, further comprising:
the second communication system is a local area network.

35. The system of claim 32, further comprising:
a key generator in the mobile station configured to generate a communication key based at least in part on the authentication information and the key generation information.

* * * * *